United States Patent
Gmirya et al.

(10) Patent No.: US 12,448,120 B2
(45) Date of Patent: Oct. 21, 2025

(54) SHAFT ASSEMBLY FOR SPLIT TORQUE GEAR BOX

(71) Applicant: Lockheed Martin Corporation, Bethesda, MD (US)

(72) Inventors: Yuriy Gmirya, Woodbridge, CT (US); Bruce P. Plasse, Woodbridge, CT (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 18/400,698

(22) Filed: Dec. 29, 2023

(65) Prior Publication Data

US 2025/0214699 A1    Jul. 3, 2025

(51) Int. Cl.
| | |
|---|---|
| B64C 27/12 | (2006.01) |
| B64C 27/10 | (2023.01) |
| F16B 7/04 | (2006.01) |
| F16C 3/02 | (2006.01) |
| F16H 1/20 | (2006.01) |
| F16H 57/00 | (2012.01) |

(52) U.S. Cl.
CPC .............. *B64C 27/12* (2013.01); *B64C 27/10* (2013.01); *F16B 7/0413* (2013.01); *F16C 3/02* (2013.01); *F16H 1/20* (2013.01); *F16H 57/0025* (2013.01); *F16C 2326/43* (2013.01)

(58) Field of Classification Search
CPC ......... B64C 27/04; B64C 27/06; B64C 27/08; B64C 27/12; B64D 35/00
See application file for complete search history.

(56) References Cited

U.S. PATENT DOCUMENTS

| | | | |
|---|---|---|---|
| 2,610,786 A | 9/1952 | Howard | |
| 4,037,404 A * | 7/1977 | Bougain | F01D 5/026 60/39.091 |
| 5,462,410 A | 10/1995 | Smith et al. | |
| 6,019,313 A * | 2/2000 | Lenhart | B64D 35/00 60/797 |
| 7,144,349 B2 * | 12/2006 | Mitrovic | F02C 6/206 74/665 F |
| 10,648,519 B2 * | 5/2020 | Przybyla | B64C 27/30 |
| 10,746,253 B2 | 8/2020 | Gmirya | |
| 10,875,634 B2 * | 12/2020 | De Dreuille De Longeville | F16H 57/025 |

(Continued)

FOREIGN PATENT DOCUMENTS

| | | |
|---|---|---|
| CN | 108696048 A | 10/2018 |
| WO | 2012024677 A2 | 2/2012 |
| WO | 2023144157 A1 | 8/2023 |

*Primary Examiner* — Justin D Seabe
(74) *Attorney, Agent, or Firm* — Michael Best & Friedrich LLP (57) ABSTRACT

A coaxial rotary-wing aircraft including a first rotor rotatable about a first axis in a first direction, a second rotor rotatable about the first axis in a second direction to provide lift, and a gearbox. The gearbox includes a first gear oriented to rotate about an axis, a second gear spaced from the first gear and oriented to rotate about the axis, and a shaft assembly extending between the first gear and the second gear. The shaft assembly includes a shaft, a lock mechanism, and a retaining extension. The shaft has a first end coupled with the first gear and a second end coupled with the second gear, the second end including at least one recess formed on an end face. The lock mechanism is removably coupled to the second end of the shaft.

19 Claims, 8 Drawing Sheets

(56) References Cited

U.S. PATENT DOCUMENTS

| | | | |
|---|---|---|---|
| 11,480,212 B2* | 10/2022 | Weaver | F16H 57/082 |
| 11,787,551 B1 | 10/2023 | Graves et al. | |
| 12,187,419 B2* | 1/2025 | Palcic | F16D 9/06 |
| 2015/0114772 A1 | 4/2015 | Babu et al. | |
| 2016/0152342 A1 | 6/2016 | Garcia | |

* cited by examiner

SHAFT ASSEMBLY FOR SPLIT TORQUE GEAR BOX

STATEMENT REGARDING FEDERALLY SPONSORED RESEARCH OR DEVELOPMENT

This invention was made with U.S. Government support under Agreement No. W911W6-19-9-0005 awarded by the U.S. Army. The Government has certain rights in the invention.

FIELD OF INVENTION

Exemplary embodiments relate to torque transmission for a coaxial rotary-wing aircraft, and more particularly, to a coaxial split torque gearbox with sequential load distribution.

BACKGROUND

A rotary wing aircraft gearbox transfers power from an engine, or multiple engines, for example, a turbine engine, to the rotor system, which may include one or more rotors of an aircraft. The gearbox is the primary mechanism for power transfer from the engines to the main rotors, and in some embodiments a portion of the power from the engines is transferred to a propulsor or thrust propeller. A conventional gearbox directs power from the engine to a single rotor system, including a plurality of rotor blades. As the rotational velocity of the rotor is typically lower than the rotational velocity of the engine, the gearbox is used to reduce the rotational velocity of the turbine engine. Torque is subsequently increased through a series of intermediate gear stages and shafts, with an output velocity provided to the rotor system.

In other rotary wing aircraft with more complex rotor systems, the complexity of the gearbox typically also increases. For example, a coaxial rotary wing aircraft has two coaxial counter-rotating main rotor assemblies. As such, the gearbox is configured to transfer engine power to both rotor assemblies at the required directions of rotation, requiring two large final reduction stages. Furthermore, in some aircrafts, the gearbox is further utilized to transfer power to a propulsor, typically located at a tail of the rotary wing aircraft, to provide additional forward thrust.

SUMMARY

One embodiment provides a coaxial rotary-wing aircraft including a first rotor rotatable about a first axis in a first direction, a second rotor rotatable about the first axis in a second direction to provide lift, and a gearbox. The gearbox includes a first gear oriented to rotate about an axis, a second gear spaced from the first gear and oriented to rotate about the axis, and a shaft assembly extending between the first gear and the second gear. The shaft assembly includes a shaft, a lock mechanism, and a retaining extension. The shaft has a first end coupled with the first gear and a second end coupled with the second gear, the second end including at least one recess formed on an end face. The lock mechanism is removably coupled to the second end of the shaft, the lock mechanism including a first side and a second side, the first side including a first projecting portion configured to engage with the at least one recess on the shaft, and the second side including a second projecting portion. The retaining extension includes an aperture configured to receive the second projecting portion of the lock mechanism through the aperture.

Another embodiment provides a coaxial split torque gearbox including a first gear oriented to rotate about an axis, a second gear spaced from the first gear and oriented to rotate about the axis, and a shaft assembly extending between the first gear and the second gear. The shaft assembly includes a shaft, a lock mechanism, and a retaining extension. The shaft has a first end coupled with the first gear and a second end coupled with the second gear, the second end including at least one recess formed on an end face. The lock mechanism is removably coupled to the second end of the shaft, the lock mechanism including a first side and a second side, the first side including a first projecting portion configured to engage with the at least one recess on the shaft, and the second side including a second projecting portion. The retaining extension includes an aperture configured to receive the second projecting portion of the lock mechanism through the aperture.

Another embodiment provides a shaft assembly for a gearbox, the shaft assembly including a shaft, a lock mechanism, and a retaining extension. The shaft has a first end and a second end, the second end including at least one recess formed on an end face. The lock mechanism is removably coupled to the second end of the shaft, the lock mechanism including a first side and a second side, the first side including a first projecting portion configured to engage with the at least one recess on the shaft, and the second side including a second projecting portion. The retaining extension includes an aperture configured to receive the second projecting portion of the lock mechanism through the aperture.

Other aspects will become apparent by consideration of the detailed description and accompanying drawings.

DETAILED DESCRIPTION

Before any embodiments are explained in detail, it is to be understood that the embodiments described herein are provided as examples and the details of construction and the arrangement of the components described herein or illustrated in the accompanying drawings should not be considered limiting. Also, it is to be understood that the phraseology and terminology used herein is for the purpose of description and should not be regarded as limited. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and may include electrical connections or couplings, whether direct or indirect. Also, electronic communications and notifications may be performed using any known means including direct connections, wireless connections, and the like.

Split-torque gearboxes require a large number of gears, bearings, and shafts to run multi-path power transmission from input shafts to output shafts. Many gearboxes require a rod housed within the shaft to retain components that transfer of rotational energy from one gear to another. However, the rods often have a large length over diameter ratio. This large length over diameter ratio may cause the rod to vibrate as vibration frequencies cross a critical mode. This vibration causes high stress in the rod.

Exemplary embodiments address these issues by providing the required functionality of a shaft gear assembly while also eliminating the large length over diameter ratio rod that is often used to retain parts together. The shaft gear assembly includes integrated locking features built upon a stiff shaft with a smaller length over diameter ratio.

With the elimination of the resonance sensitive rod, the number of parts and the weight of the design is reduced. The reduced number of parts also allows for reduced production cost and reduced development time. Additionally, by eliminating the large length over diameter ratio of the rod, the entire split-torque gearbox system has a higher reliability. As such, the exemplary embodiments described herein provide a lightweight solution, that reduces production costs while also increasing reliability of the system.

Figure 1:
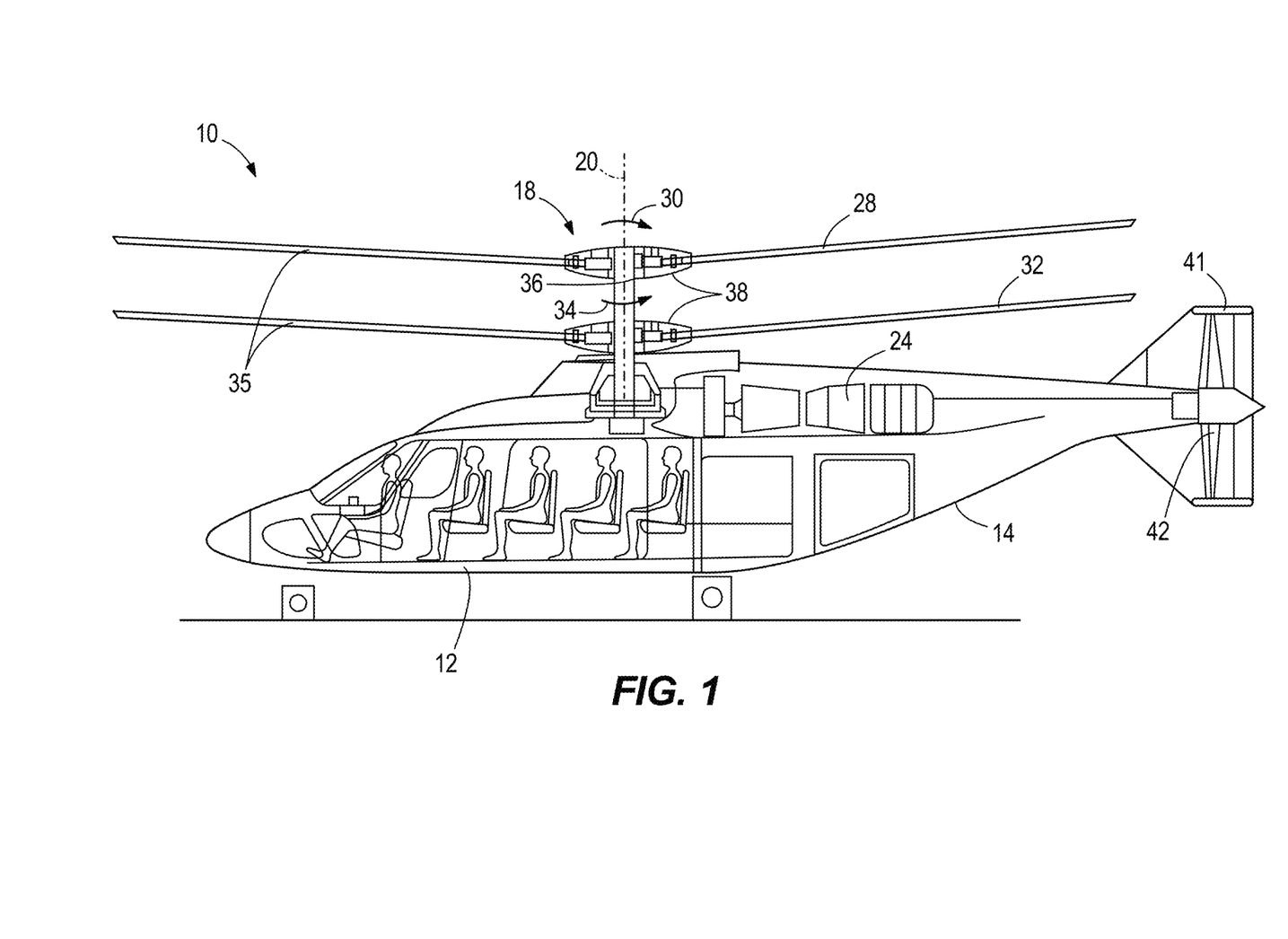
FIG. 1 depicts a side view of a coaxial rotary-wing aircraft in accordance with an exemplary embodiment.
Figure 2:
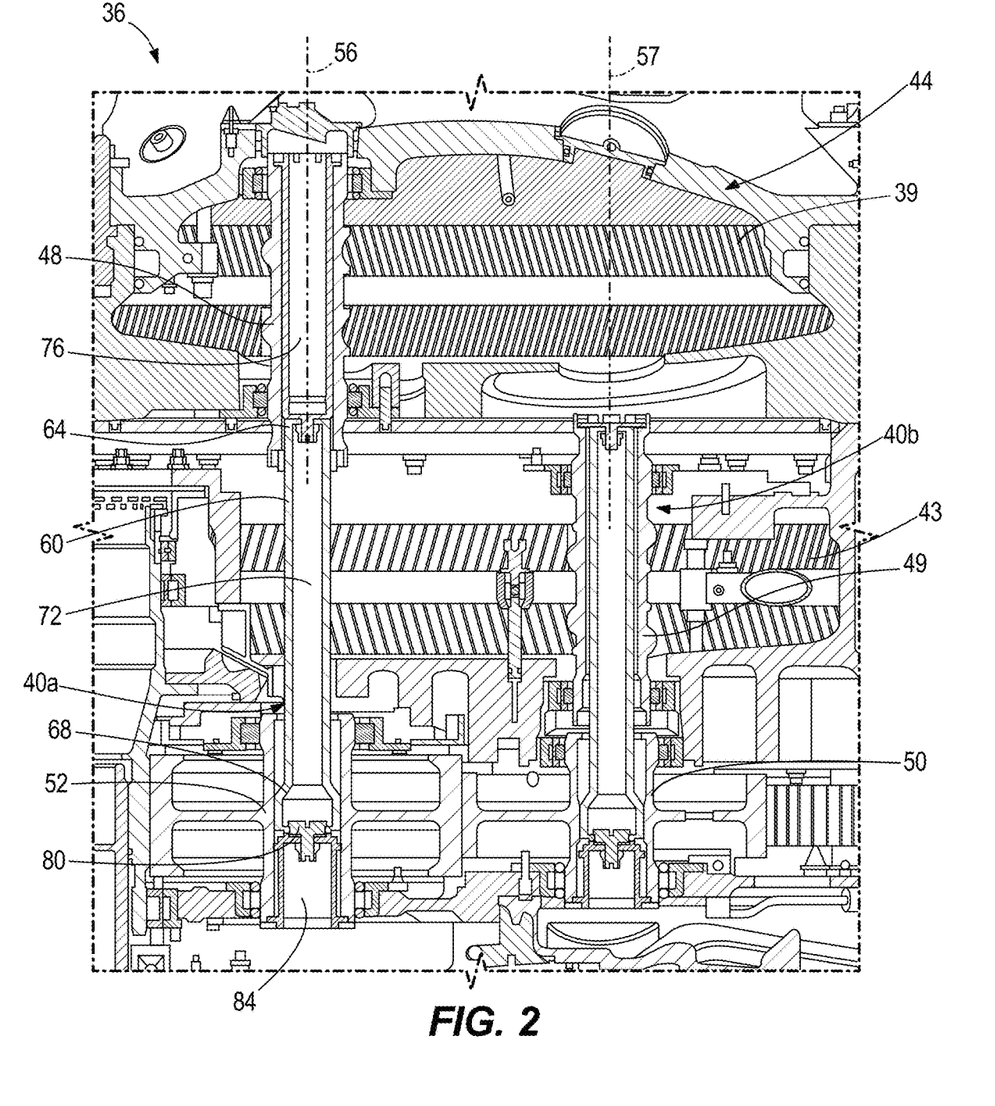
FIG. 2 depicts a cross section of a gear train utilizing a shaft assembly for the coaxial rotary-wing aircraft of FIG. 1.

Shown in FIG. 1 is a schematic view of an embodiment of a rotary-wing aircraft 10. The coaxial rotary-wing aircraft 10 includes an airframe 12 with an extending tail 14. A dual, counter-rotating coaxial main rotor assembly 18 is located at the airframe 12 and rotates about a main rotor axis or first axis 20. The main rotor assembly 18 is driven by a power source, for example, an engine 24 via a gearbox 36 (FIG. 2). The main rotor assembly 18 includes an upper rotor assembly 28 driven in a first direction 30 about the main rotor axis 20, and a lower rotor assembly 32 driven in a second direction 34 about the main rotor axis 20, opposite, but at the same or substantially same rotational speed, to the first direction 30.

While the first direction 30 is illustrated as counterclockwise and the second direction 34 is illustrated as counterclockwise, it is to be appreciated that in some embodiments, the directions of rotation of the upper rotor assembly 28 and lower rotor assembly 32 may be reversed. Each of the upper rotor assembly 28 and the lower rotor assembly 32 include a plurality of rotor blades 35 secured to a respective rotor hub 38. In some embodiments, the rotary-wing aircraft 10 further includes a translational thrust system 41 located at the extending tail 14 to provide translational thrust for the rotary-wing aircraft 10. The translational thrust system 41 includes a propeller rotor 42 connected to and driven by the engine 24 via the gearbox 36 or additional transmission systems. In some embodiments, a second gearbox may be separately mounted from the gearbox 36 (e.g., in the tail 14) to provide power to the translational thrust system 41. While shown in the context of a pusher-prop configuration, it is understood that the propeller rotor 42 could also be a puller prop or could be variably facing so as to provide torque in addition to or instead of translational thrust. It should be appreciated that although FIG. 1 depicts a coaxial rotary-wing aircraft 10 with a propeller rotor 42, the herein described gearbox 36 arranged is operable to function in connection with a rotary-wing aircraft that does not include a propeller rotor 42 or in a non-coaxial aircraft having a single rotor assembly and tail rotor.

Shown in FIG. 2 is a perspective view of the gearbox 36 according to one embodiment and in mechanical communication with an input mechanism (i.e., a motor output shaft). In the illustrated embodiment, the gearbox 36 includes more than one shaft assembly. A first shaft assembly 40a engages with the an upper bull gear 39, which is coupled with and drives the lower rotor assembly 32 of FIG. 1. A second shaft assembly 40b engages with the a lower bull gear 43 which is coupled with and drivers the upper rotor assembly 28 of FIG. 1. FIG. 2 illustrates two shaft assemblies; however, in further embodiments of the invention the gearbox 36 may include fewer or more shaft assemblies. Although only the first shaft assembly 40a is described in detail below, it should be appreciated that the second shaft assembly 40b includes the same structure with differences described herein.

The shaft assembly 40a includes an elongated shaft 60, a first, upper retaining extension 76, a second, lower retaining extension 84, and a lock mechanism 80. In the illustrated embodiment, the shaft 60 is a quill shaft. The shaft 60 is generally hollow and extends along the central axis 56 between a first end 64 and a second end 68. A central aperture 72 extends from the first end 64 to the second end 68. The shaft 60 is generally cylindrical in shape, however, in further embodiments, the shaft 60 may be any of a plurality of different shapes. The central aperture 72 allows for connecting the upper retaining extension 76 to the first end 64 of the shaft 60.

The first end 64 of the shaft 60 is coupled to the upper retaining extension 76 by a fastening mechanism 77 (FIG. 4), such as a nut. An end portion 73 of the upper retaining extension 76 extends into the central aperture 72 of the shaft 60, and the fastening mechanism 77 is threaded to the end portion 73 to couple the upper retaining extension 76 to the shaft 60. In further embodiments, different types of fastening mechanisms may be used to couple the upper retaining extension 76 to the shaft 60. The second end 68 of the shaft 60 is coupled to the lock mechanism 80, and the lock mechanism 80 removably couples the shaft 60 to the lower retaining extension 84. In the illustrated embodiments, the upper retaining extension 76 and the lower retaining extension 84 are coaxial with the shaft 60 and both generally cylindrical in shape; however, in further embodiments, the upper retaining extension 76 and the lower retaining extension 84 may be any of a plurality of different shapes.

The shaft assembly 40a is coupled with a geartrain 44 of the gearbox 36 that includes a first gear 48, which is a pinion in the illustrated embodiment, and a second gear 52, which is a driving gear in the illustrated embodiment. In further embodiments, the first gear 48 may be a double helical pinion and the second gear 52 may be a spur gear. Alternatively, the first gear 48 and the second gear 52 may be any of a plurality of different types of gears (i.e., pinion, bevel, etc.). The shaft assembly 40a, as well as the first gear 48 and the second gear 52, rotate about a central axis 56. During operation, power from the engine 24 rotates a first stage of gears (not shown) which causes rotation of the second gear 52. Rotation of the second gear 52 rotates the shaft assembly 40a and thereby rotation of the first gear 48 therewith.

Rotation of the first gear 48 rotates the upper bull gear 39, which causes rotation of the lower rotor assembly 32 The second shaft assembly 40b is similarly coupled with a third gear 49 and a fourth gear 50. The shaft assembly 40b as well as the third gear 49 and the fourth gear 50 rotate about a second central axis 57. During operation of the second shaft assembly 40b, rotation of the fourth gear 50 rotates the shaft assembly 40b and thereby rotation of the third gear 49 therewith. Rotation of the third gear 49 rotates the lower bull gear 43, which causes rotation of the upper rotor assembly 28.

In the illustrated embodiment, the first gear 48 surrounds and is coupled with the shaft 60 and the upper retaining extension 76, and the second gear 52 surrounds and is coupled with the shaft 60 and the lower retaining extension 84. The first gear 48 is coupled to the first end 64 of the shaft 60 and the upper retaining extension 76 for rotation with the shaft assembly 40a. Likewise, the second gear 52 is coupled to the second end 68 of the shaft 60 and the lower retaining mechanism 84 for rotation with the shaft assembly 40a. In the illustrated embodiment, each of the first gear 48 and the second gear 52 are coupled to the respective end 64, 68 of the shaft 60 and retaining extension 76, 84 by a spline arrangement. Alternatively, a spline arrangement may not be used and instead a plurality of other connecting means (e.g., hardware, fasteners, etc.) may be used. In further embodiments, the first gear 48 may be coupled with only the shaft 60 or only the upper retaining mechanism 76. Likewise, the second gear 52 may be coupled with only the shaft 60 or only the lower retaining extension 84. The shaft assembly 40a transfers rotational energy from the second gear 52 to the first gear 48 and in some implementations is under a torsional force. As shown, the gears are concentrically located to rotate about the central axis 56 with the shaft assembly 40a, however the invention is not limited thereto.

Figure 3:
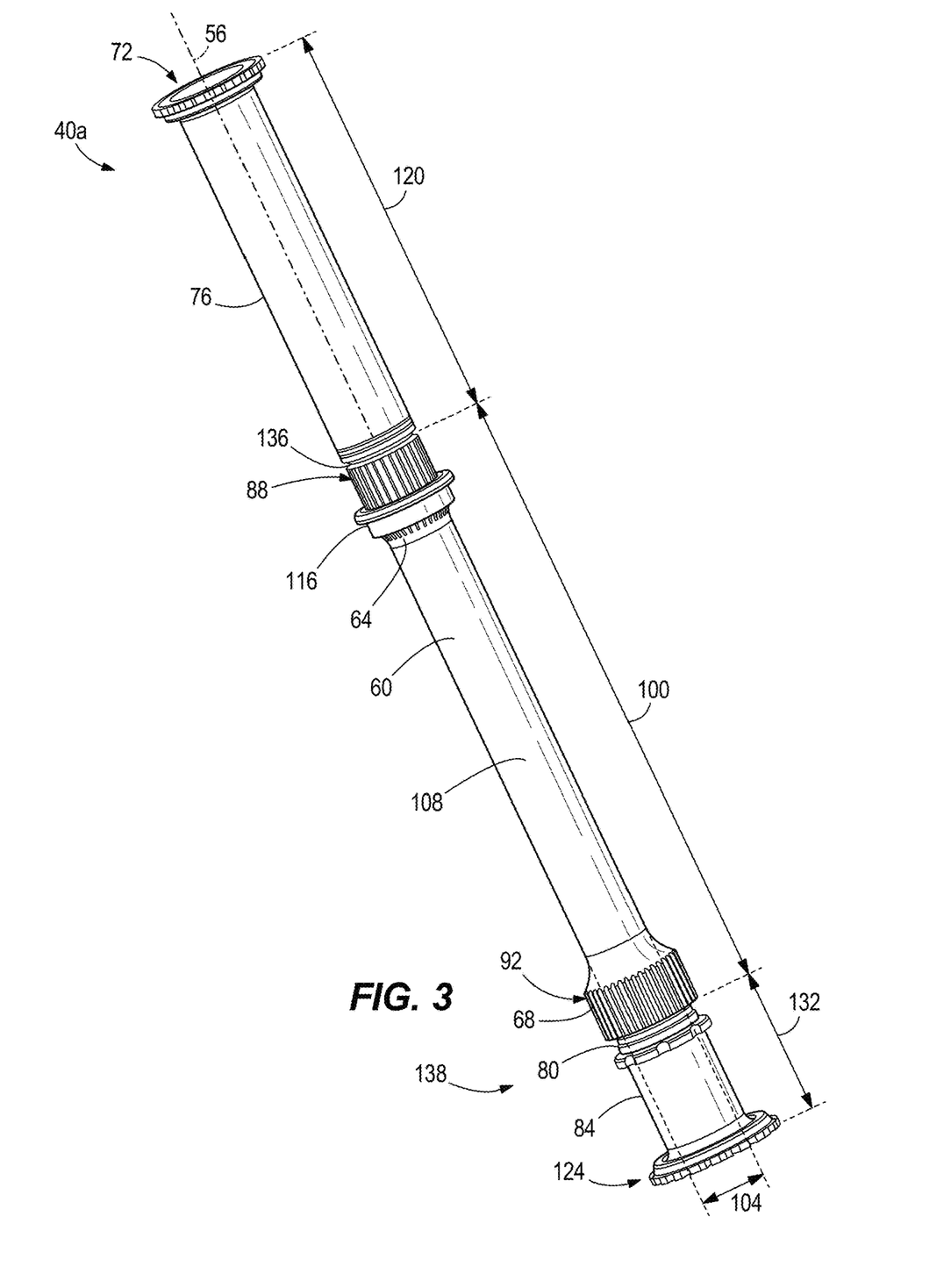
FIG. 3 depicts a perspective view of a shaft assembly for the gear train shown in FIG. 2.
Figure 4:
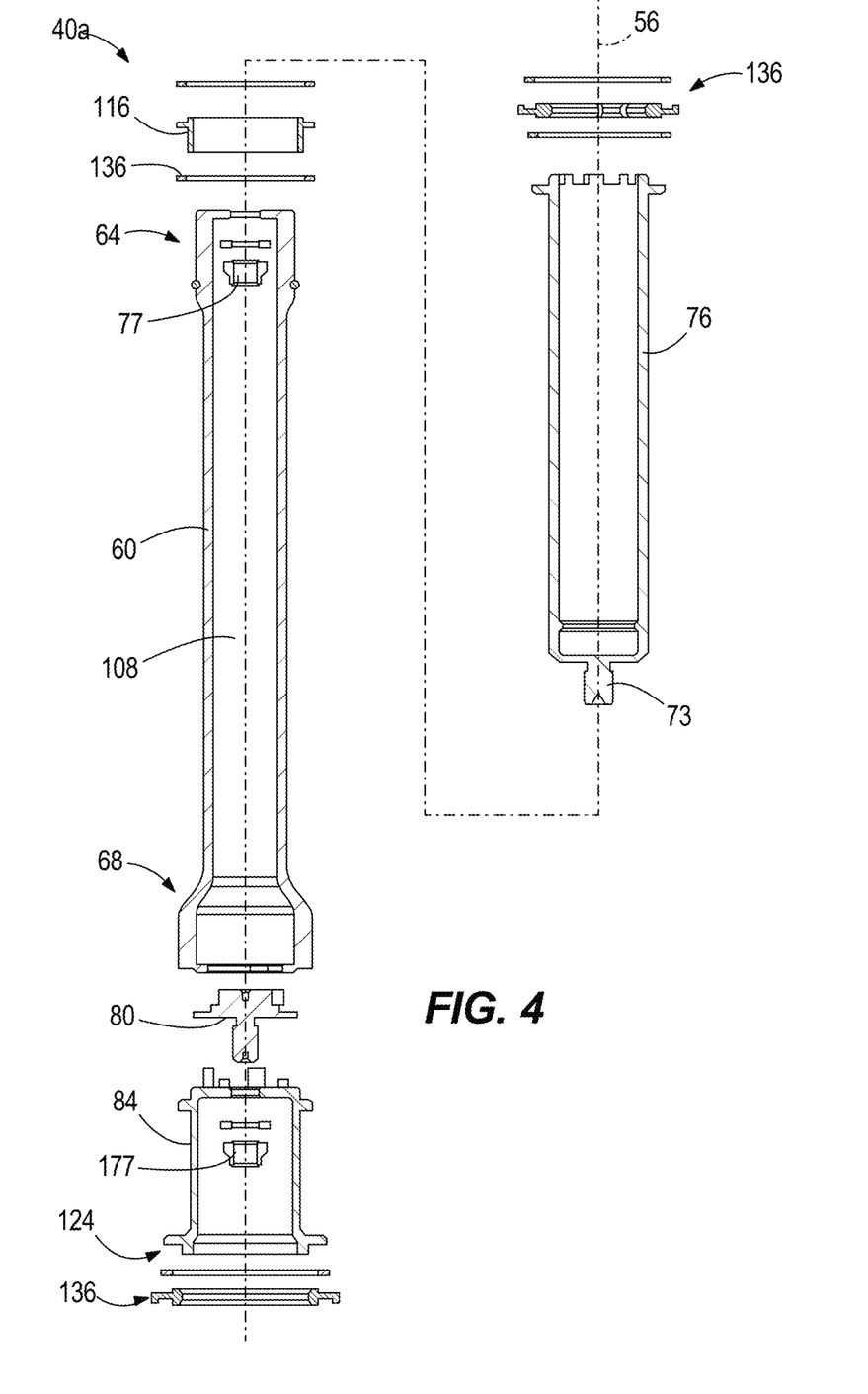
FIG. 4 depicts an exploded perspective view of the shaft assembly of FIG. 3.

FIGS. 3 and 4 illustrate the shaft assembly 40a including the shaft 60, the upper retaining extension 76, the lock mechanism 80, and the lower retaining extension 84. The central axis 56 of the shaft assembly 40a extends through the shaft 60, the upper retaining extension 76, the lock mechanism 80, and the lower retaining extension 84, which are coaxially arranged along the central axis 56.

The first end 64 of the shaft 60 includes a first spline portion 88 and the second end 68 of the shaft 60 includes a second spline portion 92. The first spline portion 88 and the second spline portion 92 are each defined by a plurality of splines 96 extending circumferentially around an outer surface of the shaft 60. The first spline portion 88 is splined with the first gear 48, and the second spline portion 92 is splined with the second gear 52.

The shaft 60 has a shaft length 100 spanning from the first end 64 to the second end 68. The shaft 60 also has a shaft diameter 104. The shaft diameter 104 is the diameter of the shaft 60 at a midpoint 108 of the shaft 60, which is halfway between the first end 64 and the second end 68. In the illustrated embodiment, a diameter at the first end 64 of the shaft 60 and a diameter at the second end 68 of the shaft 60 are similar. The shaft diameter 104 (i.e., the diameter at the midpoint 108 of the shaft 60) is less than the diameters of the first end 64 of the shaft 60 and the second end 68 of the shaft 60. The shaft 60 has a length over diameter ratio that is calculated by dividing the shaft length 100 by the shaft diameter 104. The shaft length 100 and the shaft diameter 104 may vary greatly, however, the shaft 60 is configured such that torsional wind up of the quill shaft 60 is sufficient for desired load sharing between redundant gears of the split torque gearbox 36. The redundant gears may be any of a plurality of gears within the geartrain 44. Additionally or alternately, the redundant gears may be operably connected with the first gear 48 or the second gear 52. In the present embodiment, the shaft diameter 104 is between 1 and 3 inches. In the present embodiment, the shaft length 100 is between 6 and 15 inches, and the shaft length over diameter ratio ranges between 15:1 to 2:1. In other embodiments, the shaft diameter 104 may have other nominal diameters.

The upper retaining extension 76 includes the end portion 73 receivable by the central aperture 72 on the first end 64 of the shaft 60. The end portion 73 may be generally cylindrical in shape. An oil dam sleeve 116 is coupled with the first end 64 of the shaft 60 and the upper retaining extension 76. The oil dam 116 provides oil to the splines 96 to lubricate the splines 96 and resist fretting of the splines 96. The upper retaining extension 76 has an upper extension length 120. The upper extension length 120 extends from the first end 64 of the shaft 60 to a top end of the upper retaining extension 76. In further embodiments, retaining extensions of a different length 120 may be used based upon the relative position between the shaft 60 and the respective rotor assembly (i.e., the distance needed to couple the shaft 60 to the associated rotor assembly). For example, in the first shaft assembly 40a, which engages with the upper bull gear 39, the length 120 of the upper retaining extension 76 is greater than a length of the upper retaining extension in the second shaft assembly 40b, which engages with the lower bull gear 43. Referring to FIG. 2, the upper retaining extension shown of the second shaft assembly 40b is a disc.

The lower retaining extension 84 includes an exterior portion 124 that receives a retaining ring 136 for providing a connection between the lower retaining extension 84 and the first gear 48. The lower retaining extension 84 has a lower extension length 132. The lower extension length 132 extends from the second end 68 of the shaft 60 to a bottom end of the lower retaining extension 84. In further embodiments, lower retaining extensions of a different length 132 may be used based upon the relative position between the shaft 60 and the respective rotor assembly 28, 32 (i.e., the distance needed to couple the shaft 60 to the associated rotor assembly). For example, in the first shaft assembly 40a, which engages with the lower rotor assembly 32, the length 132 of the lower retaining extension 84 is greater than a length of the lower retaining extension 84 in the second shaft assembly 40b, which engages with the upper rotor assembly 28.

Providing the retaining extensions 76, 84, whether upper or lower, connects the first and second gears such that the first gear 48 and the second gear 52 can float along the axis 56 to accommodate gearbox component misalignment due to deflection under varying loads. In some embodiments, the shaft assembly 40a, and thereby the retaining extensions 76, 84, may be scaled to different sizes and lengths to be used in different types of equipment.

As shown in FIG. 4, the shaft assembly 40a includes a plurality of retaining rings 136 to facilitate retention of the upper and lower retaining extensions 76, 84 on the shaft 60. Retaining rings 136 are received by the upper retaining extension 76 as well as the lower retaining extension 84. The retaining rings 136 retain the upper retaining extension 76 and the lower retaining extension 84 to the shaft 60 by filling any gaps between the retaining extension 76 and the shaft 60. In further embodiments, retaining rings 136 may not be included in the shaft assembly 40a. Alternately, a different number of retaining rings 136 may be included in the shaft assembly 40.

Figure 5:
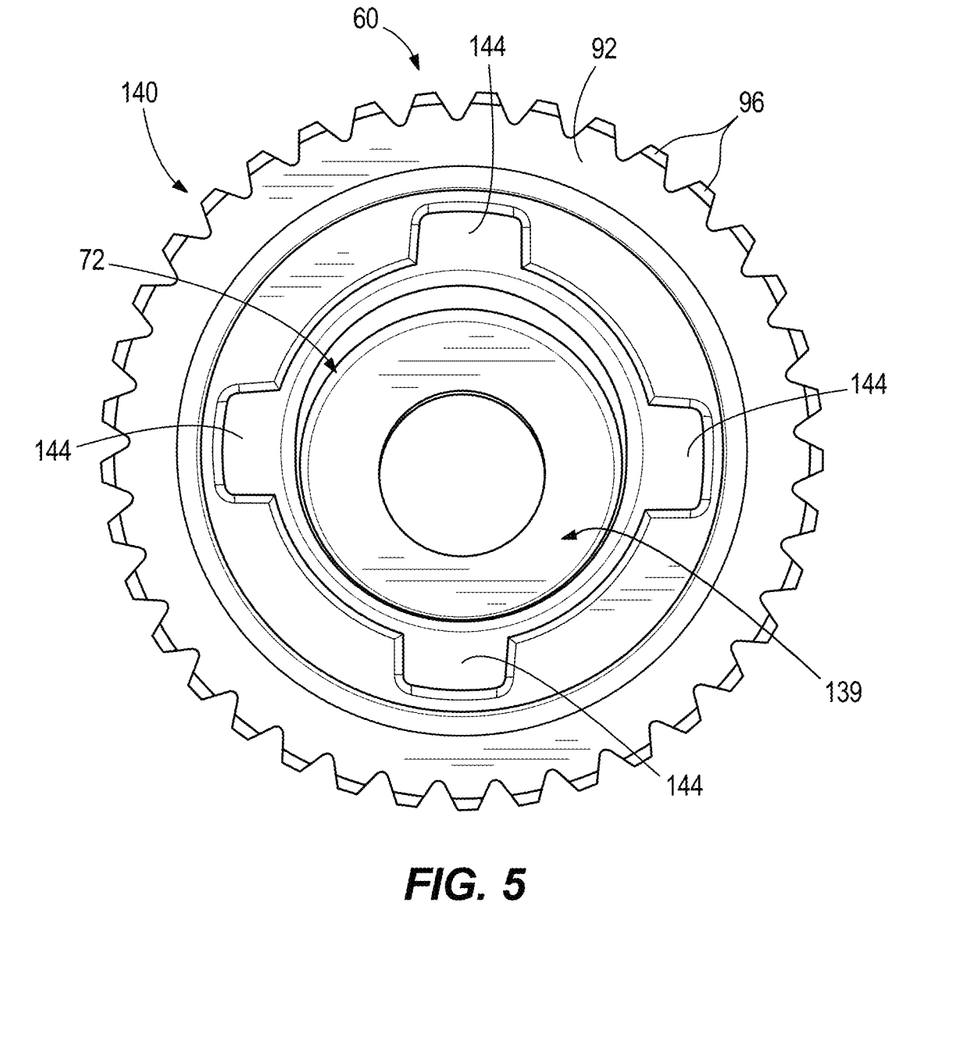
FIG. 5 depicts an end view of a shaft of the shaft assembly shown in FIG. 3.

FIGS. 5-8 illustrate a lower portion 138 of the shaft assembly 40a including the attachment of the second end 68 of the shaft 60 to the lower retaining extension 84 by the lock mechanism 80. The second end 68 of the shaft 60 includes an end face 140 defining an opening 139 to the central aperture 72 for receiving the lock mechanism 80. The opening 139 includes a plurality of recesses 144 formed on the end face 140 that define an interface for receiving the lock mechanism 80. Referring to FIG. 5, the recesses 144 formed on the end face 140 of the second end 68 of the shaft 60 are positioned circumferentially around the central axis 56, which corresponds with the center of the end face 140. In the illustrated embodiment, the opening 139 includes four recesses 144 that extend radially from the central aperture 72 of the shaft 60. Each recess 144 is generally rectangular in shape with rounded off edges. The central aperture 72 of the shaft 60 extends through the end face 140. The opening 139 of the end face 140 is therefore defined by a circle with four equally spaced recesses 144 extending around the circle. In further embodiments, the opening 139 may have other shapes and may include fewer or more recesses 144.

Figure 6A:
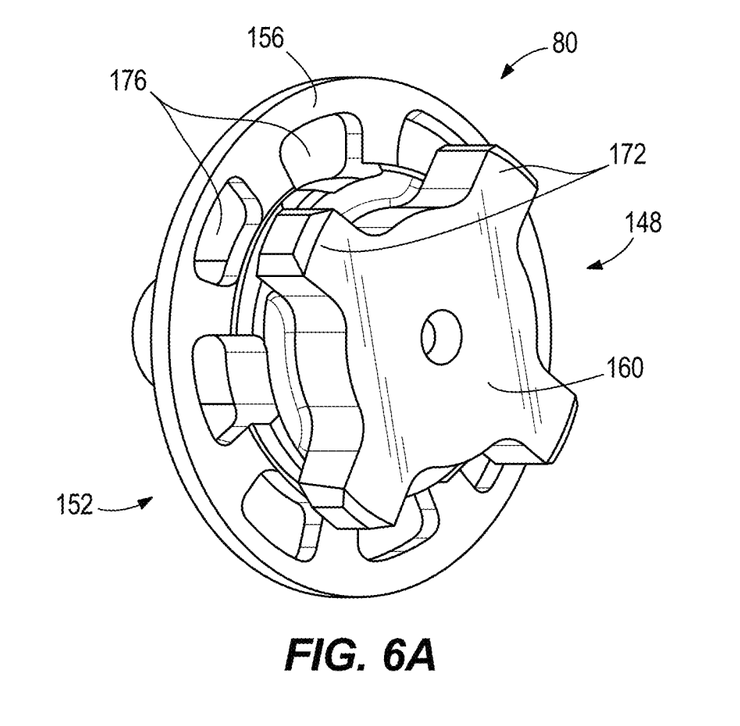
FIGS. 6A and 6B depict first and second perspective views, respectively, of a lock mechanism of the shaft assembly shown in FIG. 3.
Figure 6B:
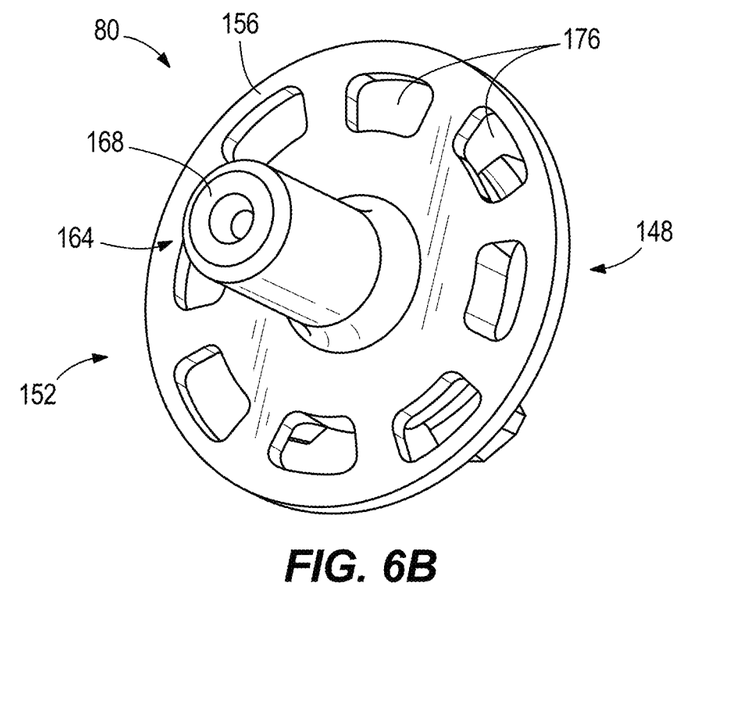

As shown in FIGS. 6A and 6B, the lock mechanism 80 is generally circular in shape, however, in further embodiments, the lock mechanism 80 may be another shape, including those complementary to the shape of the opening 139. In the present embodiment, the lock mechanism is a retaining plug configured to retain the lower retaining extension 84 to the shaft 60. The lock mechanism 80 can be coupled with the lower retaining extension 84 and with the shaft 60 to couple the two together. The lock mechanism 80 includes a base plate 156 having a first side 148 and a second side 152. The first side 148 of the lock mechanism 80 is removably coupled with the shaft 60 and the second side 152 is removably coupled with the lower retaining extension 84.

The first side 148 of the base plate 156 includes a first projecting portion 160 extending axially therefrom for coupling with the shaft 60, and the second side 152 includes a second projecting portion 164 extending axially therefrom for coupling with the lower retaining extension 84. In the illustrated embodiment, the first projecting portion 160 is defined by a center portion 168 with four equally spaced-apart arms 172 extending circumferentially around the center portion 168. The arms 172 are sized and shaped to be received within the recesses 144 on the shaft 60. In other words, the first projecting portion 160 on the lock mechanism 80 is an inverse shape to that of the opening 139 formed on the end face 140 of the shaft 60. The spaced-apart arms 172 are generally rectangular in shape with rounded off edges. In further embodiments, there may be fewer or more arms 172, or the shape of the protrusion may be different. In still further embodiments, the projecting portion 160 may have other shapes that complement and fit within the opening 139 of the shaft 60.

The base plate 156 of the lock mechanism 80 includes a plurality of holes 176 extending radially around the central axis 56 and along an outer edge of the base plate 156. In the illustrated embodiment, the base plate 156 includes eight holes 176, each generally rectangular in shape with rounded edges. However, in further embodiments, the base plate 156 may include fewer or more holes 176 and/or the shape of the holes 176 may have a different shape.

The second projecting portion 164 of the lock mechanism 80 extends axially from the second side 148 of the base plate 156 and along the central axis 56. The second projecting portion 164 is generally cylindrical; however, in further embodiments, the second projecting portion 164 may be other shapes.

Figure 7A:
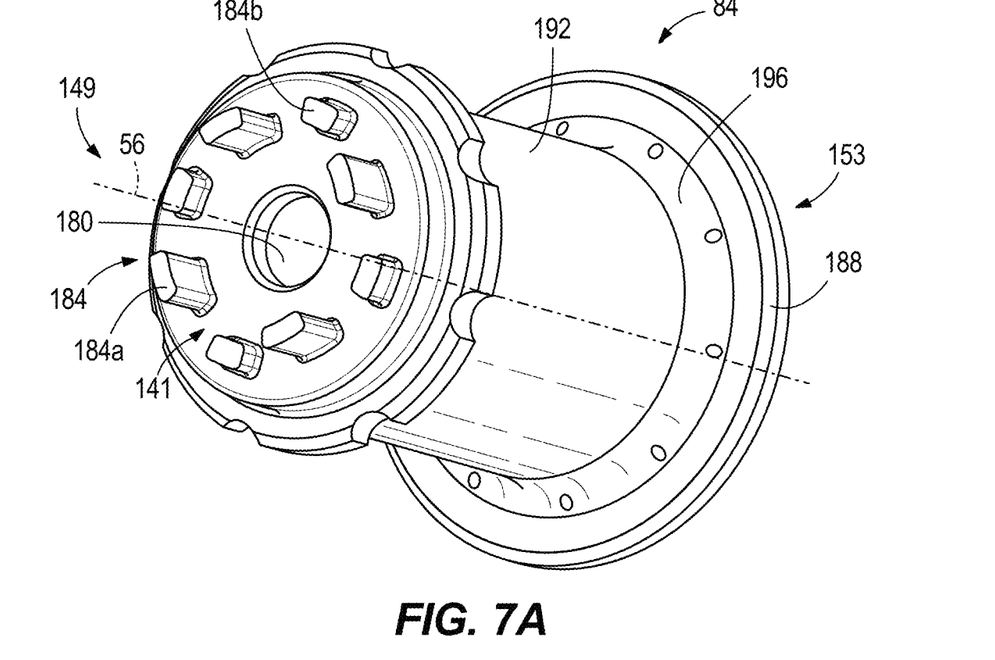
FIGS. 7A and 7B depict first and second perspective views of a lower retaining extension of the shaft assembly shown in FIG. 3.
Figure 7B:
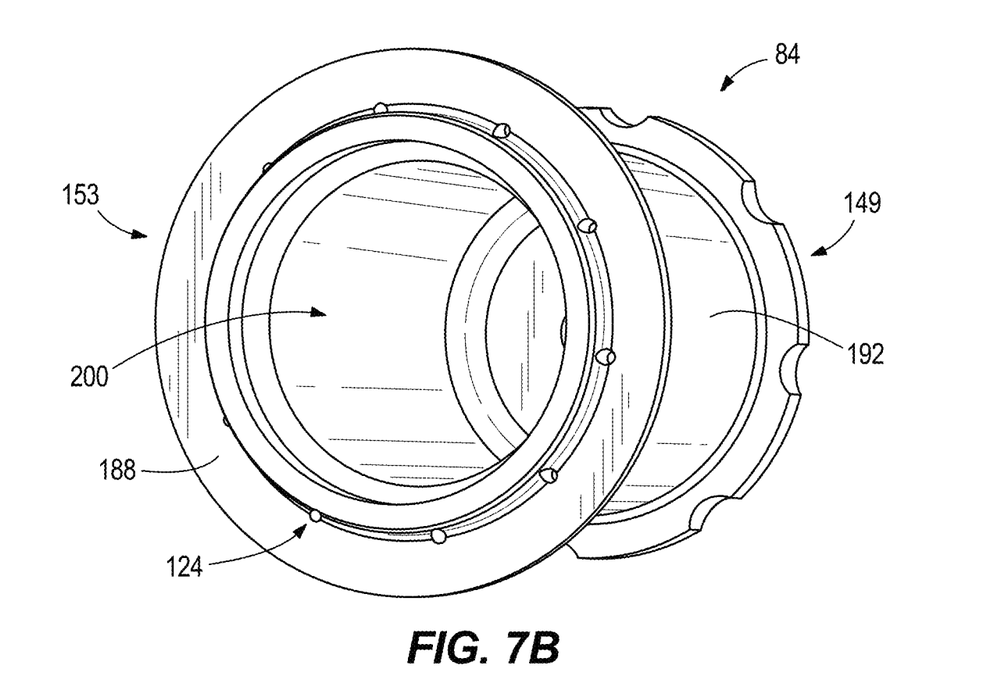

As shown in FIGS. 7A and 7B, the lower retaining extension 84 is generally cylindrical in shape and includes a hollow interior 200. The lower retaining extension 84 includes a body 192 defining the interior 200 and having a first end 149 defining an end face 141 and a second end 153 opposite the first end 149. The end face 141 includes an aperture 180 for receiving the second projecting portion 164 of the lock mechanism 80. The lower retaining extension 84 further includes a plurality of retaining protrusions 184 extending axially from the end face 141. The retaining protrusions 184 are arranged radially outward from and circumferentially around the central axis 56 of the lower retaining extension 84. The retaining protrusions 184 are receivable through the holes 176 located on the lock mechanism 80 for securing the lock mechanism 80 to the lower retaining extension 84. The retaining protrusions 184 include retaining protrusions 184a having a first axial length along the central axis 56 and retaining protrusions 184b having a second axial length along the central axis 56 shorter than the first length. In the present embodiment, the lower retaining extension 84 includes four long retaining protrusions 184a and four short retaining protrusions 184b. The retaining protrusions 184 are each generally rectangular in shape with rounded edges. The retaining protrusions 184 are an inverse shape and complementary to the shape of the holes 176 formed on the base plate 156 of the lock mechanism 80.

The second end 153 of the lower retaining extension 84 includes a shoulder 188 extending radially outward from the body 192. A chamfer 196 extends between the body 192 and the shoulder 188. The lower retaining extension 84 is open at the second end 153 such that a hollow interior 200 is accessible. The second end 152 of the lower retaining extension 84 further includes the exterior portion 124 defined by the shoulder 188 and the body 192. The exterior portion 124 receives the lock ring 128 to secure the shaft assembly 40a together.

Figure 8:
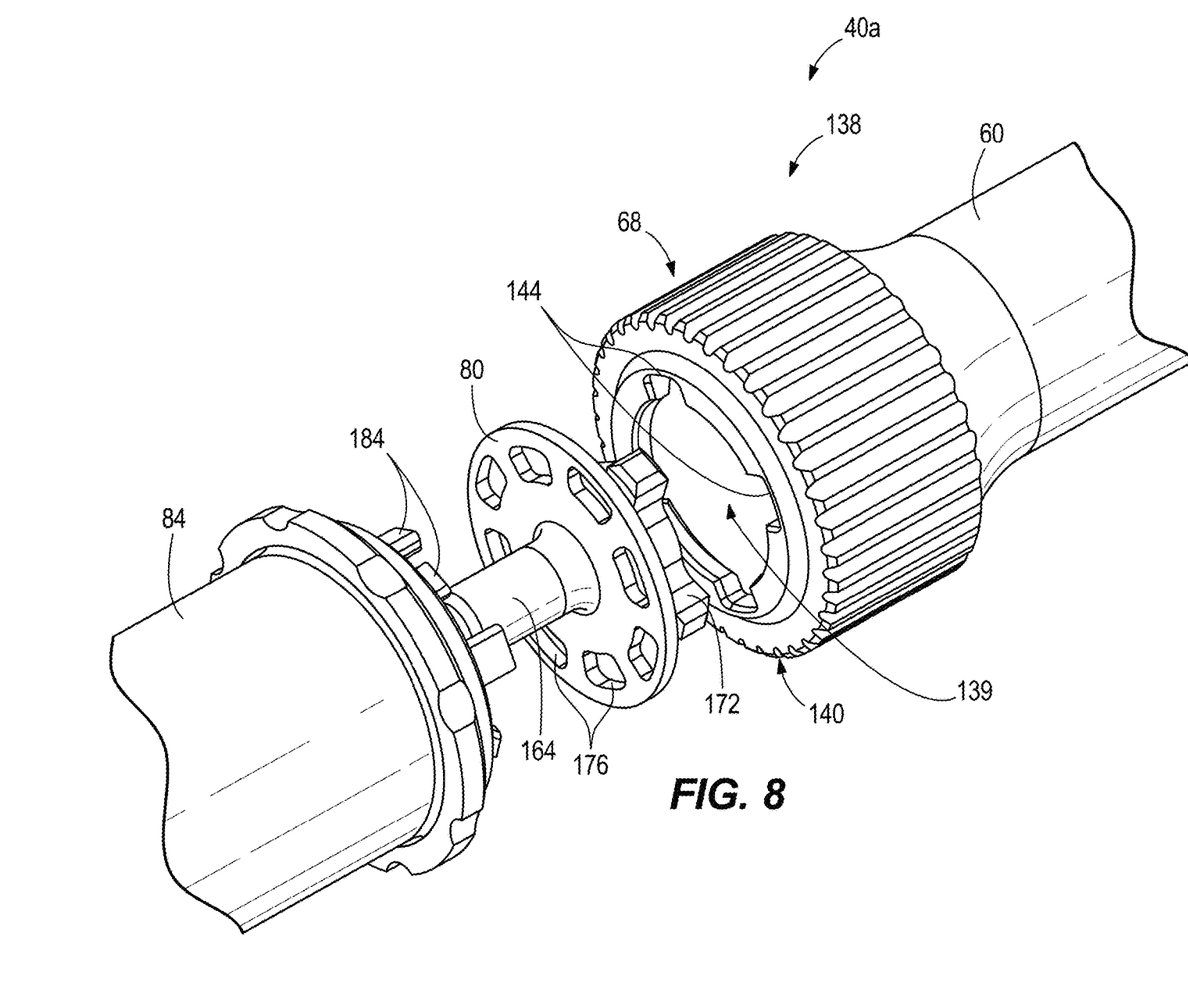
FIG. 8 depicts an exploded perspective view of a lower portion of the shaft assembly shown in FIG. 3.

During assembly, the lock mechanism 80 is inserted into the second end 68 of the shaft 60 such that the arms 172 are seated within the recesses 144 of the opening 139 on the end face 140 of the shaft 60. When the recesses 144 are aligned with the arms 172, the lock mechanism 80 is in an unlocked position, which permits removal of the lock mechanism 80 from the second end 68 of the shaft 60. The lock mechanism 80 is then rotated within the second end 68 such that the recesses 144 no longer align with the arms 172. In this instance, the lock mechanism 80 is in a locked position, which prohibits removal of the lock mechanism 80 from the second end 68 of the shaft 60. Once the lock mechanism 80 is inserted and in the locked position, the retaining protrusions 184 of the lower retaining extension 84 are inserted into the holes 176 of the lock mechanism 80. The lower retaining extension 84 is further coupled to the lock mechanism 80 by a fastening mechanism 177, such as a nut. The fastening mechanism 177 is threaded to the second projecting portion 164 of the lock mechanism 80 to connect the lower retaining extension 84 to the lock mechanism 80.

Various features and advantages of the embodiment described herein are set forth in the following claims.

What is claimed is:

1. A rotary-wing aircraft comprising:
   a first rotor rotatable about a first axis in a first direction to provide lift; and
   a gearbox comprising
      a first gear oriented to rotate about an axis,
      a second gear spaced from the first gear and oriented to rotate about the axis, and a shaft assembly extending between the first gear and the second gear, the shaft assembly including,
a shaft having a first end coupled with the first gear and a second end coupled with the second gear, the second end including at least one recess formed on an end face,
a lock mechanism removably coupled to the second end of the shaft, the lock mechanism including a base plate with a first side and a second side, a first projecting portion extending axially from the first side and configured to engage with the at least one recess on the shaft, and a second projecting portion extending axially from the second side, and
a retaining extension including an aperture configured to receive the second projecting portion of the lock mechanism through the aperture;
wherein the retaining extension is configured to be coupled to the lock mechanism by a fastening mechanism.

2. The rotary-wing aircraft of claim 1, wherein the first end of the shaft is surrounded by and coupled with the first gear and the first gear is a double helical pinion.

3. The rotary-wing aircraft of claim 1, wherein the second end of the shaft is surrounded by and coupled with the second gear and the second gear is a spur gear.

4. The rotary-wing aircraft of claim 1, wherein the first projecting portion includes a central portion with arms radially extending therefrom, the arms configured for receipt by the at least one recess for coupling the shaft to the retaining extension.

5. The rotary-wing aircraft of claim 4, wherein when the recesses are aligned with the arms, the lock mechanism is in an unlocked position, and when the lock mechanism is rotated within the second end such that the recesses no longer align with the arms, the lock mechanism is in a locked position.

6. The rotary-wing aircraft of claim 5, wherein the unlocked position permits removal of the lock mechanism, and the locked position prohibits removal of the lock mechanism from the second end of the shaft.

7. The rotary-wing aircraft of claim 1, wherein the fastening mechanism is a nut that is threaded to the second projecting portion of the lock mechanism.

8. A split torque gearbox comprising:
a first gear oriented to rotate about an axis;
a second gear spaced from the first gear and oriented to rotate about the axis; and
a shaft assembly extending between the first gear and the second gear, the shaft assembly including,
a shaft having a first end coupled with the first gear and a second end coupled with the second gear, the second end including at least one recess formed on an end face;
a lock mechanism removably coupled to the second end of the shaft, the lock mechanism including a base plate with a first side and a second side, a first projecting portion extending axially from the first side and configured to engage with the at least one recess on the shaft, and a second projecting portion extending axially from the second side, and
a retaining extension including an aperture configured to receive the second projecting portion of the lock mechanism through the aperture;
wherein the retaining extension is configured to be coupled to the lock mechanism by a fastening mechanism.

9. The split torque gearbox of claim 8, wherein the shaft has a shaft length over shaft diameter ratio that ranges between 15:1 to 2:1.

10. The split torque gearbox of claim 8, wherein the retaining extension is a lower retaining extension and further comprising an upper retaining extension configured to be coupled with the first end.

11. The split torque gearbox of claim 8, wherein the first projecting portion includes a central portion with arms radially extending therefrom, the arms configured for receipt by the at least one recess for coupling the shaft to the retaining extension.

12. The split torque gearbox of claim 11, wherein when the recesses are aligned with the arms, the lock mechanism is in an unlocked position, and when the lock mechanism is rotated within the second end such that the recesses no longer align with the arms, the lock mechanism is in a locked position.

13. The split torque gearbox of claim 12, wherein the unlocked position permits removal of the lock mechanism, and the locked position prohibits removal of the lock mechanism from the second end of the shaft.

14. The split torque gearbox of claim 8, wherein the first end of the shaft is surrounded by and coupled with the first gear and the first gear is a double helical pinion, and the second end of the shaft is surrounded by and coupled with the second gear and the second gear is a spur gear.

15. A shaft assembly for a gearbox, the shaft assembly comprising:
a shaft having a first end and a second end, the second end including at least one recess formed on an end face;
a lock mechanism removably coupled to the second end of the shaft, the lock mechanism including a base plate with a first side and a second side, a first projecting portion extending axially from the first side and configured to engage with the at least one recess on the shaft, and a second projecting portion extending axially from the second side; and
a retaining extension including an aperture configured to receive the second projecting portion of the lock mechanism through the aperture;
wherein the retaining extension is configured to be coupled to the lock mechanism by a fastening mechanism.

16. The shaft assembly of claim 15, wherein the first projecting portion includes a central portion with arms radially extending therefrom, the arms configured for receipt by the at least one recess for coupling the shaft to the retaining extension.

17. The shaft assembly of claim 16, wherein when the recesses are aligned with the arms, the lock mechanism is in an unlocked position, and when the lock mechanism is rotated within the second end such that the recesses no longer align with the arms, the lock mechanism is in a locked position.

18. The shaft assembly of claim 17, wherein the unlocked position permits removal of the lock mechanism, and the locked position prohibits removal of the lock mechanism from the second end of the shaft.

19. The shaft assembly of claim 15, wherein the retaining extension is a lower retaining extension and further comprising an upper retaining extension configured to be coupled with the first end of the shaft.

* * * * *